Patented Aug. 6, 1929.

1,723,545

UNITED STATES PATENT OFFICE.

HANS FINKELSTEIN AND HANS HÄUBER, OF UERDINGEN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

PROCESS OF PREPARING 1-PHENYL-3-METHYL-5-PYRAZOLONE.

No Drawing. Application filed February 10, 1927, Serial No. 167,349, and in Germany October 21, 1925.

It is already known to oxidize phenylmethylpyrazolidone in an alcoholic solution with ferric chloride to the corresponding pyrazolone. It is also known to prepare 1-phenyl-5-pyrazolone-3-carboxylic acid by oxidizing the corresponding pyrazolidone carboxylic acid by means of ferric chloride in an aqueous solution.

Now we have found that when using an aqueous hydrochloride solution and oxygen or an oxygen-containing gas as oxidizing agent, the oxidation can be effected in an excellent manner by adding to the compounds as catalysts salts of the heavy metals capable of acting as oxygen-carriers.

The reaction probably takes place in two phases which may be illustrated by the following two equations:

(1) 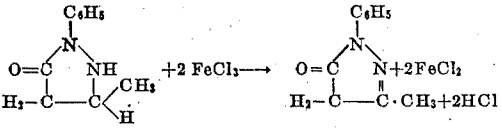

(2) $4\ FeCl_2 + 4HCl + O_2 = 4\ FeCl_3 + 2H_2O$

The following example serves to illustrate our invention, but it is not intended to limit it thereto:

30 kg. of phenylmethylpyrazolidone are dissolved in 250 liters of diluted hydrochloric acid containing 13.2 kg. HCl; to this solution are added 3 kg. of ferric chloride and 0.6 kg. of copper chloride. Oxygen is then passed at ordinary temperature through the solution thus prepared, while well stirring, preferably under a somewhat increased pressure, until the required quantity of oxygen has been absorbed by the liquid. Already during the passage of the air through the solution crystals of phenylmethylpyrazolone hydrochloride are precipitated. When the introduction of oxygen is complete, the crystallization process is accelerated by cooling the liquid to about 5° C. In this manner 25 kg. of the hydrochloride are obtained. After the quantities of phenylmethylpyrazolidone and hydrochloric acid consumed have been reintroduced, the mother liquor may be employed for a new oxidation process without adding a further quantity of the catalyst. By a number of operations following each other in the manner above indicated the pyrazolone derivative is obtained with an almost quantitative yield.

We claim:

1. Process for the production of 1-phenyl-3-methyl-5-pyrazolone, which comprises treating 1-phenyl-3-methyl-5-pyrazolidone in an aqueous solution of hydrochloric acid with oxygen in the presence of a copper salt capable of acting as oxygen-carrier.

2. Process for the production of 1-phenyl-3-methyl-5-pyrazolone, which comprises treating 1-phenyl-3-methyl-5-pyrazolidone in an aqueous solution of hydrochloric acid with oxygen in the presence of copper chloride.

In testimony whereof, we affix our signatures.

HANS FINKELSTEIN.
HANS HÄUBER.